(12) United States Patent
Imai

(10) Patent No.: US 6,816,188 B1
(45) Date of Patent: Nov. 9, 2004

(54) ELECTRONIC STILL CAMERA WITH IMAGING OPERATION PERFORMED IN PARALLEL WITH CAMERA SHAKE DETECTION

(75) Inventor: Yuji Imai, Quarry Bay (HK)

(73) Assignee: Olympus Corporation, Tokyo (JP)

( * ) Notice: Subject to any disclaimer, the term of this patent is extended or adjusted under 35 U.S.C. 154(b) by 745 days.

(21) Appl. No.: 09/585,013

(22) Filed: Jun. 1, 2000

(30) Foreign Application Priority Data

Jun. 3, 1999 (JP) ............................ 11-156550

(51) Int. Cl.[7] .............................................. H04N 5/228
(52) U.S. Cl. .............................. 348/208.2; 348/208.1; 348/208.12
(58) Field of Search ...................... 348/208.1, 208.2, 348/208.12, 208.15, 208.16, 296–299; 396/53

(56) References Cited

U.S. PATENT DOCUMENTS 5,365,303 A  * 11/1994 Yamasaki et al. ............. 396/53
5,790,490 A     8/1998 Satoh et al. .................. 396/52
5,905,848 A     5/1999 Yano et al. .................. 386/117
6,067,420 A  *  5/2000 Hara et al. .................... 396/55

FOREIGN PATENT DOCUMENTS

JP          8-256289       10/1996
JP          10-48681        2/1998

* cited by examiner

Primary Examiner—Andrew Christensen
Assistant Examiner—Dorothy Wu
(74) Attorney, Agent, or Firm—John C. Pokotylo; Straub & Pokotylo

(57) ABSTRACT

An electronic still camera includes an imaging device imaging an object. A release section puts the imaging operation of said imaging device into effect. A camera shake detection circuit detects the quantity of camera shake during the imaging operation of said imaging device. A sequence control circuit evaluates the quantity of camera shake during the imaging operation detected by camera shake detection circuit in response to the release operation by said release section and reads out an imaging signal when the result of camera shake detection is below a predetermined value.

7 Claims, 6 Drawing Sheets

ELECTRONIC STILL CAMERA WITH IMAGING OPERATION PERFORMED IN PARALLEL WITH CAMERA SHAKE DETECTION

CROSS-REFERENCE TO RELATED APPLICATIONS

This application is based upon and claims the benefit of priority from the prior Japanese Patent Application No. 11-156550, Jun. 3, 1999, the entire contents of which is incorporated herein by reference.

BACKGROUND OF THE INVENTION

The present invention relates to an electronic still camera, and particularly to a camera shake proof electronic still camera being adapted to detect camera shake and to start an exposure operation at the timing of the camera shake becoming small.

In Jpn. Pat. Appln. KOKAI Publication No. 10-48681, a silver salt camera is disclosed which is adapted to monitor camera shake conditions after the release operation and to start film exposure when the quantity of camera shake has dropped below a predetermined value.

Further, in Jpn. Pat. Appln. KOKAI Publication No. 8-256289, a digital camera estimating the release time at which the result of shake detection falls within a predetermined permissible value and generating an image acquisition signal is disclosed.

However, since accidental camera shakes have no regularity, it is difficult to estimate them, and due to such error factors as response delay of a mechanical shutter, start delay of integration control of an imaging element or the like, a method of estimating camera shake conditions can not always produce a satisfactory result.

BRIEF SUMMARY OF THE INVENTION

Therefore, the object of the present invention is to provide an electronic still camera having an improved camera shake preventing performance without estimating future camera shake conditions and without involving an increase in cost or size.

In order to attain said object, an electronic still camera according to a first aspect of the present invention comprises:

an imaging device imaging an object;
a release section putting an imaging operation of said imaging device into effect;
a camera shake detection circuit detecting the quantity of camera shake during the imaging operation of said imaging device; and
a sequence control circuit evaluating the quantity of camera shake during the imaging operation detected by said camera shake detection circuit in response to a release operation by said release section and reading out an imaging signal when the result of camera shake detection is below a predetermined value.

Further, an electronic still camera according to a second aspect of the present invention comprises:

an imaging control circuit capable of repeating an imaging operation by an imaging device in response to a release operation;
a camera shake detection circuit detecting camera shake conditions in parallel with said imaging operation; and
a sequence control circuit evaluating the quantity of camera shake at a predetermined time of imaging operation by the imaging device, instructing the next imaging operation when the quantity of camera shake is below a predetermined value and terminating the imaging operation in order to read out picture data when the quantity of camera shake is below the predetermined value.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

Now, the embodiments of the present invention will be described in detail with reference to the drawings.

Figure 1:
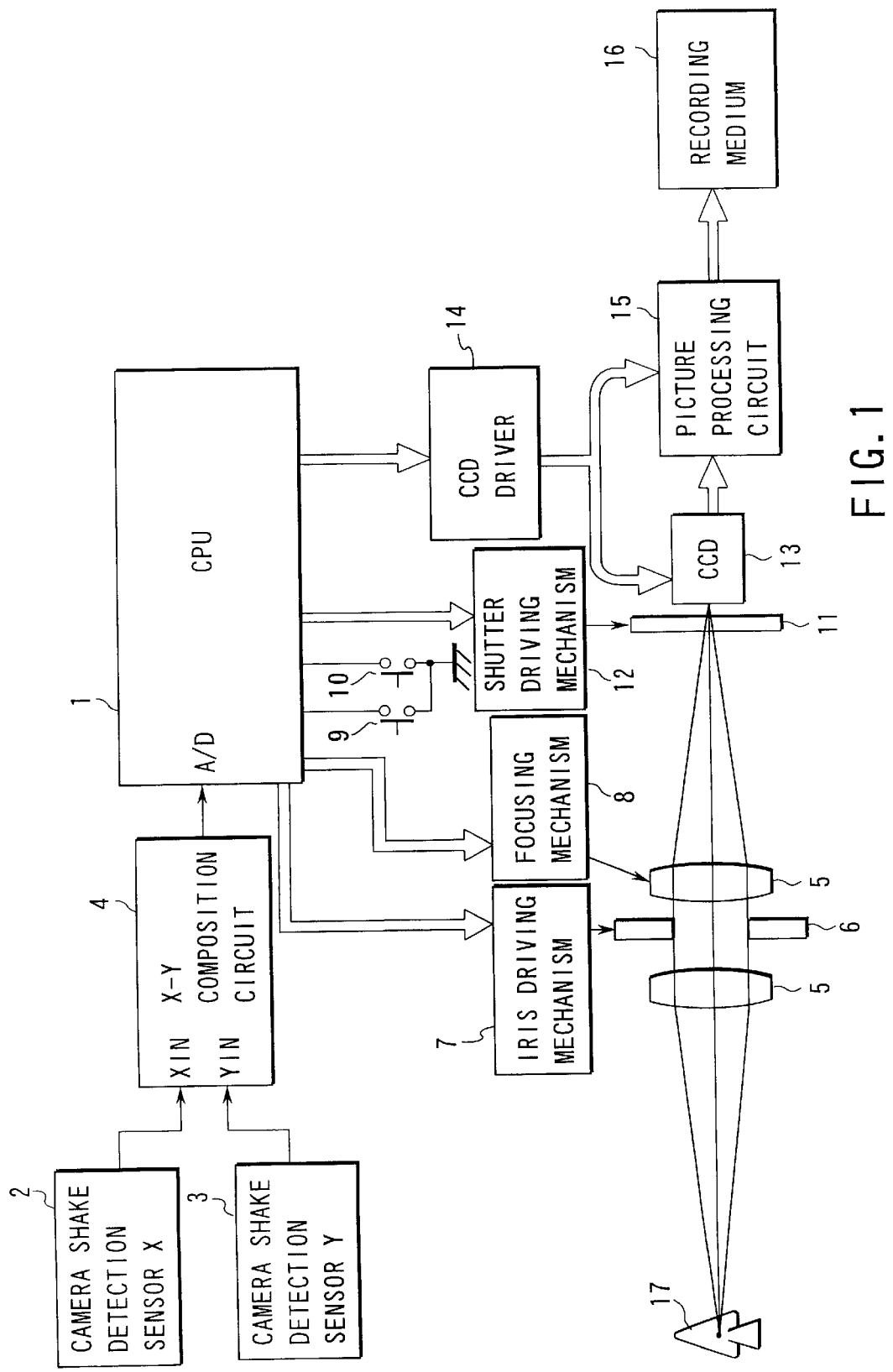
FIG. 1 is a functional block diagram of an electronic still camera according to a first embodiment of the present invention.

FIG. 1 is a functional block diagram of an electronic still camera according to a first embodiment of the present invention. CPU 1 is a sequence control means performing the sequence control of a camera. The camera shake detection sensor X2 is a sensor detecting camera shake around the X-axis direction (yaw direction) on the image formation plane in the camera and comprises an oscillating gyro in this embodiment. The camera shake detection sensor Y3 is a sensor detecting camera shake around the Y-axis direction (pitch direction) on the image formation plane in the camera and comprises an oscillating gyro. The X-Y composition circuit 4 is a circuit for composing an output voltage from the camera shake detection sensors X2 and Y2 analog and for finding an absolute value of the quantity of camera shake. Said camera shake detection sensors X2 and Y3 and said X-Y composition circuit 4 constitute a camera shake detection means.

Further, a photographing lens 5 for photographing an object 15 and an iris 6 for limiting the quantity of light from the object. The iris 6 is driven by means of an iris driving mechanism 7. Further, the focusing mechanism 8 is a mechanism driving a part of the photographing lens 5 for focusing.

1RSW 9 is a switch put into ON by a first stroke (half push) of a release button. 2RSW is a switch put into ON by a second stroke (full push) of the release button. A focal-plane shutter 11 is provided in the vicinity of the film plane and is driven by means of a shutter driving mechanism 12.

The CCD imaging device 13 is a device for obtaining a digital picture from the object image. The CCD driver 14 drives and controls the CCD imaging device 13 based upon control signals from CPU 1. Said CPU 1 and CCD driver 14 constitute an imaging control means.

The picture processing circuit 15 is a circuit processing analog signals from the CCD imaging device 13, and under the control of the CCD driver 14 it performs processing activities such as A/D conversion of analog picture signals, color conversion, compression of picture data and the like. The signals processed by means of the picture processing circuit 15 are recorded on a recording medium 16.

Figure 2:
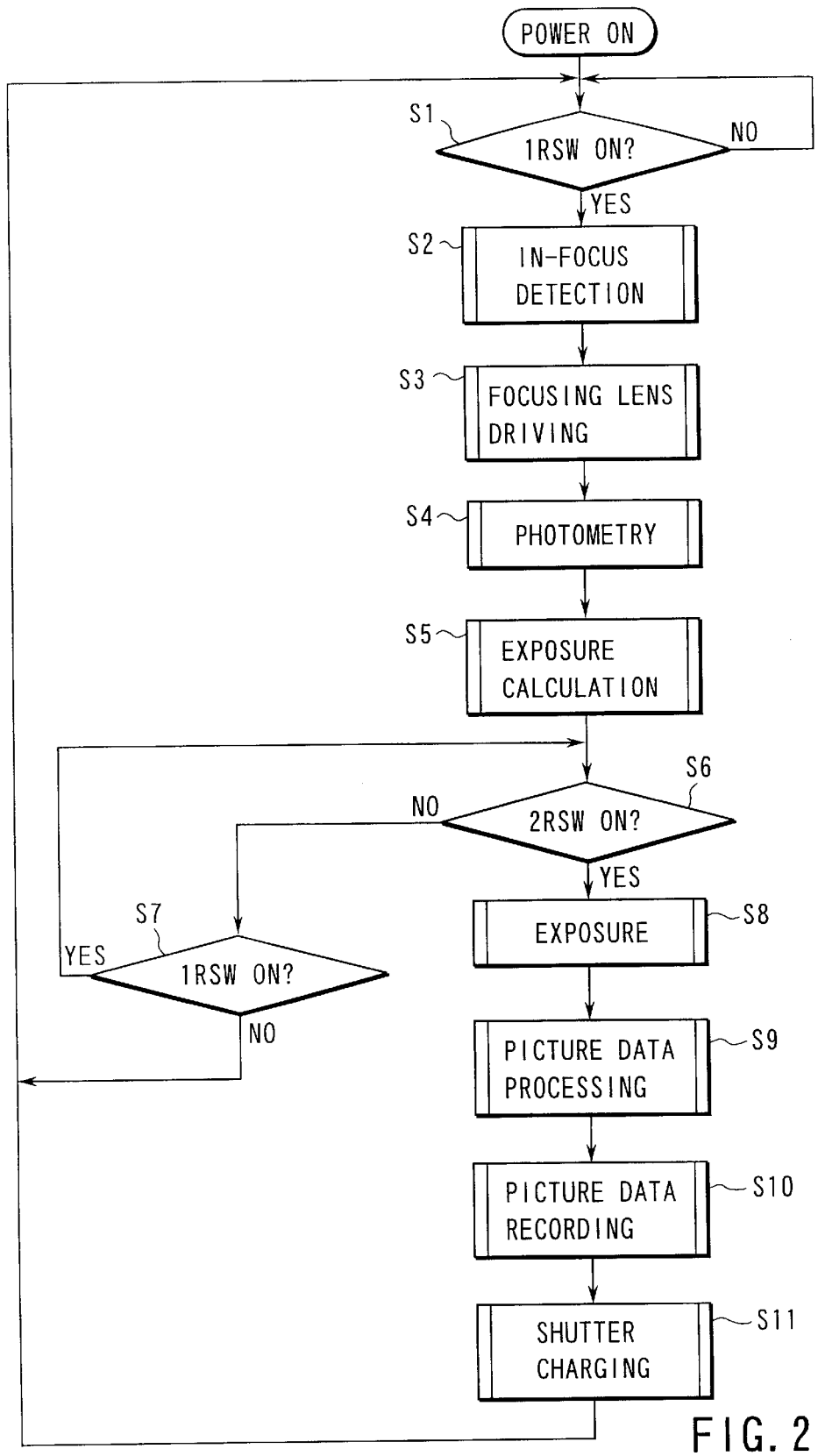
FIG. 2 is a flowchart for illustrating the operation of the electronic still camera according to this embodiment.

FIG. 2 is a flowchart for illustrating the operation of the electronic still camera according to this embodiment. The operation starts by putting a power SW (not disclosed) into ON. First, the condition of 1RSW 9 is monitored, and when 1RSW 9 is in ON, the sequence proceeds to Step S2, and when it is not in ON, Step S1 is repeated. In Step 2, in-focus detection is performed by means of an in-focus detection (focusing condition detection) means (not shown). In next Step S3 the lens is driven for focus adjustment corresponding to the quantity of defocus (the quantity of out-of-focus) obtained in Step S2. Here, a part of the photographing lens 5 is driven by the focusing mechanism 8 being driven and controlled.

In next Step S4 photometry is performed by means of a photometric circuit (not shown). Subsequently, according to the result of said photometry, exposure calculations (Step S5) are performed, and the set value of the iris 6 and the exposure time Tint of the CCD imaging device 13 are found.

In next Step S6 the condition of 2RSW 10 is monitored, and when 2RSW 10 is in ON, the sequence proceeds to Step S8, and when it is not in ON, the sequence proceeds to Step S7. In Step S7 the condition of 1RSW 9 is monitored, and when 1RSW is in ON, the sequence proceeds to Step S6, and when it is not in ON, the sequence returns to Step S1.

In Step 8 exposure is performed. This processing activity will be described in detail later. In next Step S9 picture processing is performed with respect to the picture data obtained from the CCD imaging device 13 in the picture processing circuit 15. Next, the sequence proceeds to Step 10, and the processed data are recorded on the recording medium 16. In Step 11 the shutter is charged. In the focal-plane shutter 11 the driving source is a spring, and as a preparatory operation prior to the operation it is necessary to charge the spring (to charge the shutter).

Figure 3A:
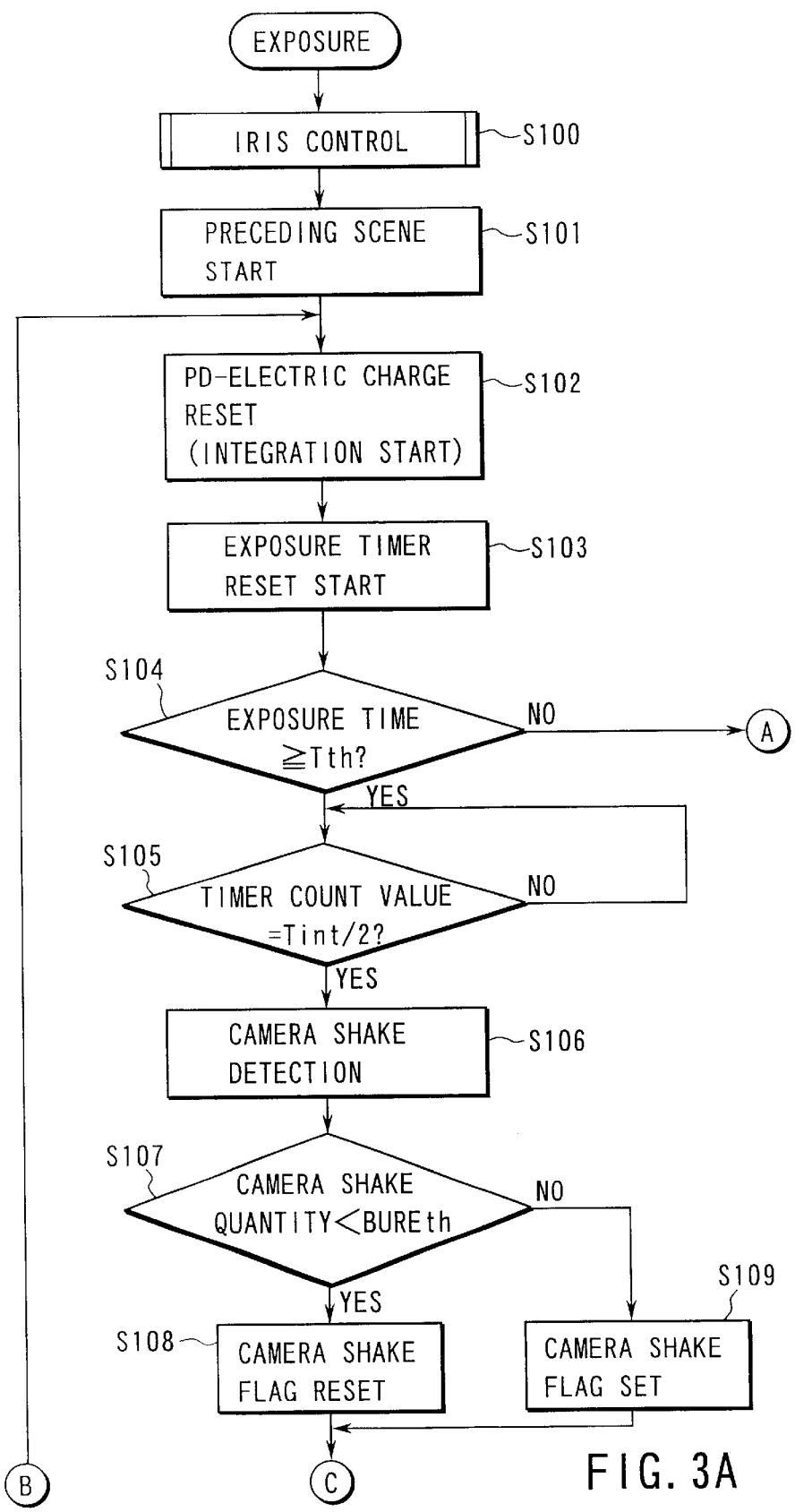
FIGS. 3A and 3B are flowcharts showing an exposure processing in Step S8 in detail.
Figure 3B:
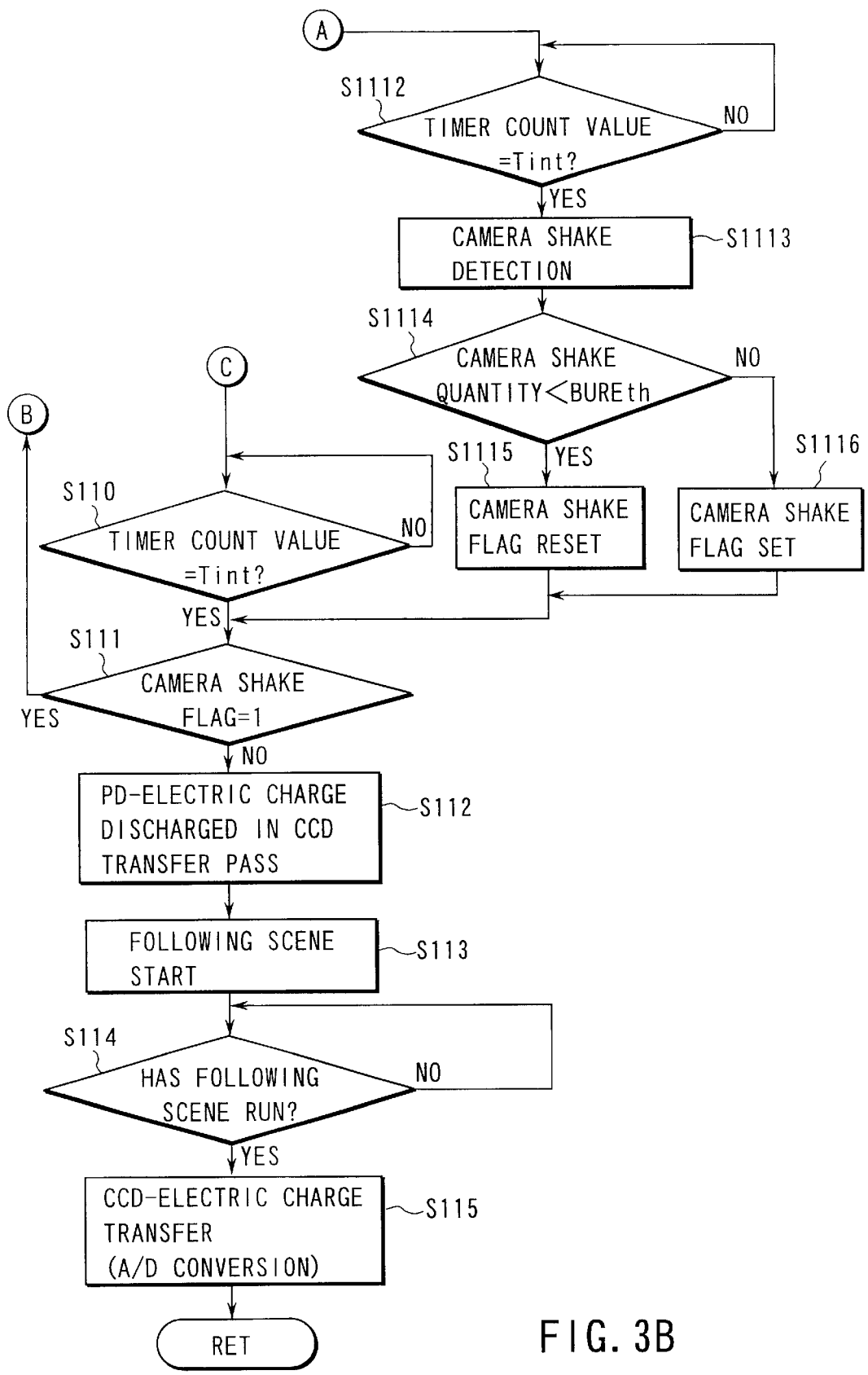

FIGS. 3A and 3B are flowcharts showing an exposure processing in Step S8 in detail. First, in Step S100 the iris driving mechanism 7 is controlled, and the iris 6 is driven and controlled. In next Step S101, a preceding scene is started with respect to the focal-plain shutter 11 by means of the shutter driving mechanism 12. In next Step S102 the electric charge accumulated in each photo diode PD in the CCD imaging device 13 is reset in order to be removed, and an integration operation is started. In next Step S103 an exposure time is reset and started. In this embodiment the exposure time is controlled by an electronic shutter function of the CCD imaging device 13.

In next Step S104 it is judged whether the exposure time Tint determined in Step S5 is longer than a predetermined time Tth or not, and according to the result thereof the following sequence is changed. When Tint is relatively long, that is, in case of Tint≧Tth, the sequence proceeds to Step S105, and when Tint is relatively short, that is, in case of Tint<Tth, the sequence proceeds to Step S112.

In Step S105 it is judged whether the count value of the exposure timer has reached Tint/2 or not, and when the count value has reached Tint/2, since it is in the middle point of the exposure time, the sequence proceeds to Step S106, and when it has not reached Tint/2, Step S105 is repeated.

In Step S106 the analog output voltage from the X-Y composition circuit 4 is inputted via an A/D conversion input terminal, and the quantity of camera shake is found. In next Step S107 the found quantity of camera shake and a permissible value BUREth is compared, and in case of the quantity of camera shake<BUREth, since the quantity of camera shake is permissible, the sequence proceeds to Step S108. And in case of the quantity of camera shake≧BUREth, since the quantity of camera shake is not permissible, the sequence proceeds to Step S109. In Step S108 the camera shake flag is reset to 0. In Step S109 the camera shake flag is reset to 1.

In Step S110 it is judged whether the count value of the exposure timer has reached Tint or not, and when the timer count value is equal to Tint, the sequence proceeds to Step S111, and when the timer count value is not equal to Tint, Step S110 is repeated.

On the other hand, in Step S104, when Tint is relatively short, that is, in case of Tint<Tth, the sequence proceeds to Step S1112, however, in this step it is judged whether the count value of the exposure timer has reached Tint or not, and when the count value has reached Tint/2, the sequence proceeds to Step S1113, and when it has not reached Tint, Step S1112 is repeated. Since the processing activities in Steps S1113 to S1116 are identical to those in said Steps S106 to S109, the description thereof will be omitted here.

In Step S111 it is judged whether the camera shake flag is equal to 1 or not, and in case of YES it is judged that the quantity of camera shake is impermissibly large, the sequence returns to Step S102, and the integration control of the CCD imaging device 13 is performed repeatedly. And when the camera shake flag is equal to 0, it is judged that the quantity of camera shake is permissibly large, and the sequence proceeds to Step S112. In this step the electric charge accumulated in PD is discharged to a CCD transfer pass. Next, in Step S113 a following scene is started with respect to the focal-plane shutter 11 by means of the shutter driving mechanism 12. The reason why the following scene is run in Step S113 is that light must not enter the CCD transfer pass when the electric charge is transferred in the CCD transfer pass in order to prevent the generation of smear.

In next Step S114 it is monitored by means of signals from a following scene run detection means whether the following scene has run or not, and when the following scene has run, the sequence proceeds to Step S115, and when it has not yet run, the judgement in Step S114 is repeated.

In Step 115 the electric charge discharged in the CCD transfer pass is transferred by means of the CCD imaging device. At the same time, the analog picture signals outputted from the CCD imaging device 13 are converted to digital picture signals by means of the picture processing circuit 15. Next, the sequence returns.

Figure 4:
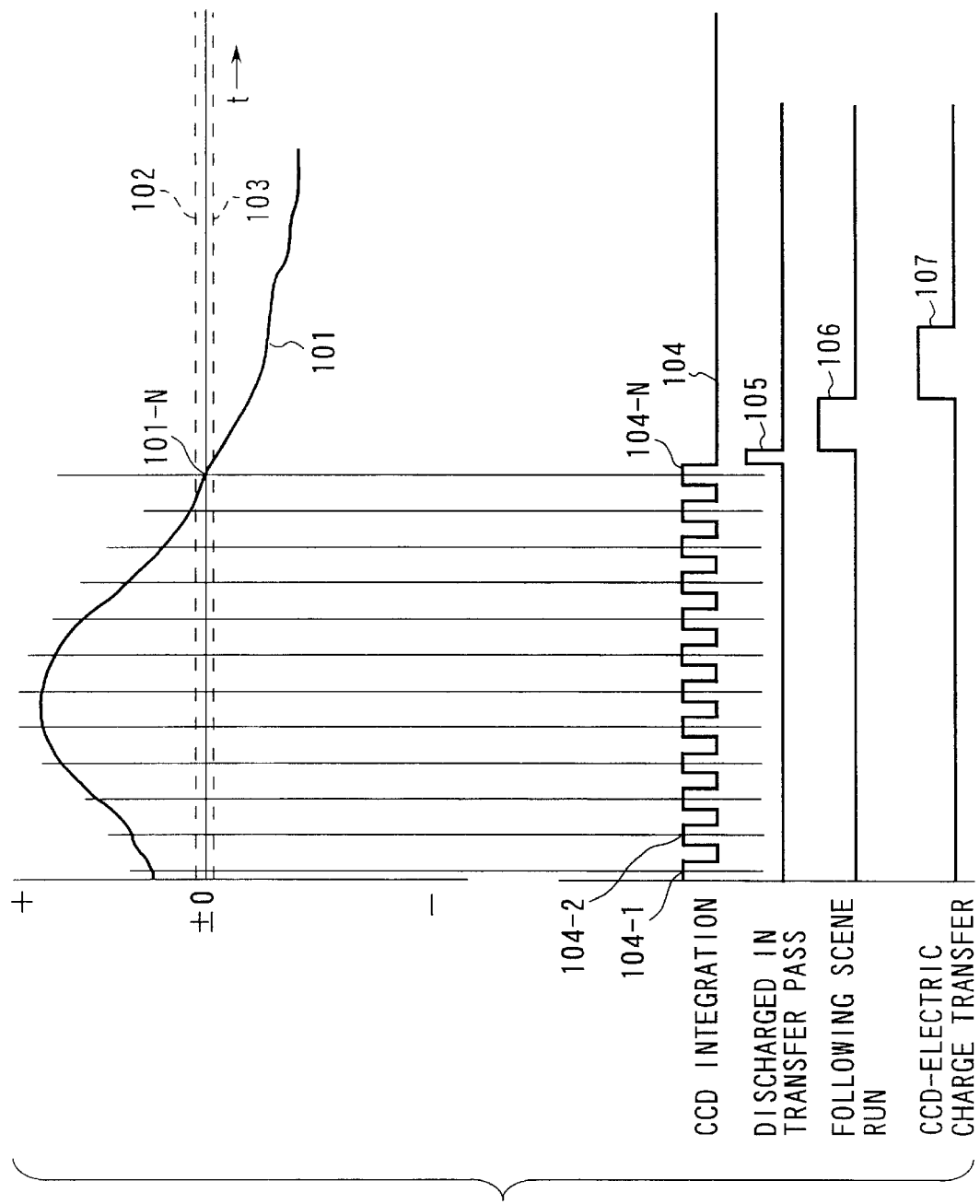
FIG. 4 is a timing chart for illustrating the parts of the processing activities corresponding to Steps S102 to S115 in the flowcharts shown in FIGS. 3A and 3B.

FIG. 4 is a timing chart for illustrating the parts of the processing activities corresponding to Steps S102 to S115 in the flowcharts shown in FIGS. 3A and 3B. The transverse axis represents the time lapsed, and the longitudinal axis represents the quantity of camera shake. The camera shake condition is detected in parallel with the imaging operation. According to this camera shake detection, the quantity of camera shake 101 which is represented by the output voltage of the X-Y composition circuit 4 varies with time as shown in the figure. 102 and 103 represent lines showing the permissible range (upper and lower limit) of the quantity of camera shake having a zero-point in the middle point.

104 represents the integration time of the electric charge of the CCD imaging device 13. 104-1, 104-2, . . . , and 104-N represent the first, second, . . . , and N-th integration periods respectively. In 104-N the quantity-of camera shake in the middle point of the integration period (exposure time) is 101-N and falls within the permissible range of the quantity of camera shake for the first time. 105 represents the timing at which the electric charge accumulated in PD is discharged in the CCD transfer pass. 106 represents the running period of the following scene. 107 represents the electric charge transfer period of the CCD imaging device 13.

According to the first embodiment, the imaging operation and the camera shake operation are performed repeatedly in parallel, and when the result of each camera shake detection is below the predetermined value, the imaging operation is stopped and the imaging data are read out, and therefore, an electronic still camera having an improved camera shake preventing performance without estimating future camera shake conditions and without involving an increase in cost or size can be provided.

Second Embodiment

Figure 5:
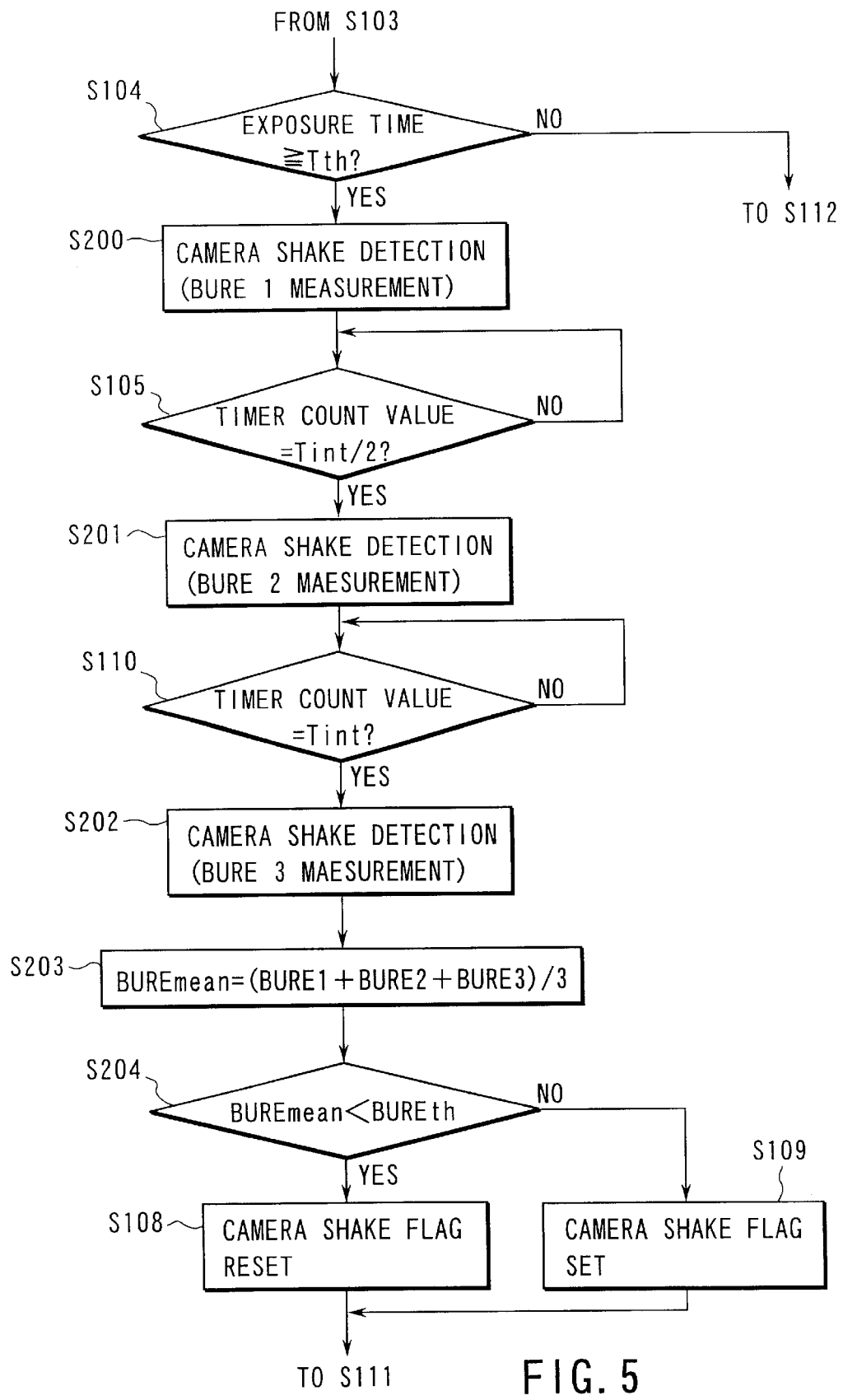
FIG. 5 is a part of a sequence showing the exposure according to a second embodiment of the present invention in detail.

Now, a second embodiment of the present invention will be described. FIG. 5 is a part of a sequence showing the exposure according to a second embodiment of the present invention in detail. The description of the parts in this figure having the same step numbers as in FIGS. 3A and 3B will be omitted because they are the same processes. In the second embodiment, camera shake detections are performed at the beginning, in the middle and at the end of the integration period of the CCD imaging device, and BURE 1 to 3 are found respectively (Steps S200, S201 and S202). And in Step 203 an average value of said BURE 1 to 3 is found, and in Step 204 the quantity of camera shake is judged.

According to the second embodiment, in addition to the advantages of the first embodiment, a more precise camera shake can be performed.

Moreover, from said concrete embodiments an invention having the following composition is extracted.

An electronic still camera being capable of repeating the imaging operation comprising:

an exposure means controlling the exposing operation of the pickup device;

a camera shake detection means detecting the quantity of camera shake during the operation of this exposure means;

a camera shake judgment means judging the result of camera shake detection during the particular exposure operation after the end of each exposure operation; and an operation control means comparing the output of this camera shake judgment means with a predetermined level and starting said exposure operation again when the quantity of camera shake is above the predetermined level.

According to the present invention, an electronic still camera having an improved camera shake preventing performance without estimating future camera shake conditions and without involving an increase in cost or size can be provided.

Additional advantages and modifications will readily occur to those skilled in the art. Therefore, the in its broadest aspects is not limited to the specific details and representative embodiments shown and described herein. Accordingly, various modifications may be made without departing from the spirit or scope of the general inventive concept as defined by the appended claims and their equivalents.

What is claimed is:

1. An electronic still camera comprising:

an imaging control circuit capable of repeating an imaging operation by an imaging device in response to a release operation;

a camera shake detection circuit detecting camera shake conditions in parallel with said imaging operation; and a sequence control circuit evaluating a quantity of camera shake at a predetermined time of imaging operation by the imaging device, instructing the next imaging operation when the quantity of camera shake is over a predetermined value and terminating the imaging operation in order to read out picture data when the quantity of camera shake is below the predetermined value.

2. The electronic still camera according to claim 1, wherein said predetermined time is set linked with an exposure time.

3. The electronic still camera according to claim 2, wherein said predetermined time is in a middle point of the exposure time when the exposure time is longer than a predetermined value.

4. The electronic still camera according to claim 2, wherein said predetermined time is at an end of the exposure time when the exposure time is shorter than a predetermined value.

5. The electronic still camera according to claim 1, wherein said camera shake detection circuit detects the quantity of camera shake at a plurality of predetermined points of time.

6. The electronic still camera according to claim 5 further comprising:

an average camera shake quantity detection circuit finding an average quantity of camera shake based upon the quantity of camera shake at said plurality of predetermined points of time.

7. An electronic still camera comprising:

an imaging control circuit capable of repeating an imaging operation by an imaging device in response to a release operation in order to obtain a picture data and to record the picture data on a recording medium;

a camera shake detection circuit detecting camera shake conditions in parallel with said imaging operation; and a sequence control circuit evaluating a quantity of camera shake at a predetermined time of imaging operation by the imaging device, instructing the next imaging operation when the quantity of camera shake is over a predetermined value and terminating the imaging operation in order to obtain a picture data and to record the picture data on the recording medium when the quantity of camera shake is below the predetermined value.

* * * * *